US010668679B2

(12) United States Patent
Prandini et al.

(10) Patent No.: US 10,668,679 B2
(45) Date of Patent: Jun. 2, 2020

(54) PROCESS FOR PRODUCING TYRES

(71) Applicant: PIRELLI TYRE S.P.A., Milan (IT)

(72) Inventors: Elena Prandini, Milan (IT); Pierluigi De Cancellis, Milan (IT); Alberto Scurati, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 282 days.

(21) Appl. No.: 15/537,873

(22) PCT Filed: Nov. 17, 2015

(86) PCT No.: PCT/IB2015/058866
§ 371 (c)(1),
(2) Date: Jun. 19, 2017

(87) PCT Pub. No.: WO2016/108097
PCT Pub. Date: Jul. 7, 2016

(65) Prior Publication Data
US 2017/0361555 A1 Dec. 21, 2017

(30) Foreign Application Priority Data

Dec. 29, 2014 (IT) .............................. MI2014A2259

(51) Int. Cl.
*B29B 7/00* (2006.01)
*B29B 7/90* (2006.01)
(Continued)

(52) U.S. Cl.
CPC .............. *B29D 30/08* (2013.01); *B29B 7/005* (2013.01); *B29B 7/007* (2013.01); *B29B 7/183* (2013.01);
(Continued)

(58) Field of Classification Search
CPC ......... B29B 7/005; B29B 7/007; B29B 7/183; B29B 7/465; B29B 7/48; B29B 7/7461;
(Continued)

(56) References Cited

U.S. PATENT DOCUMENTS 3,632,256 A 1/1972 Kasting et al.
4,089,718 A 5/1978 Triolo et al.
(Continued)

FOREIGN PATENT DOCUMENTS

CN 101903145 A 1/2010
DE 10331451 A1 1/2005
(Continued)

OTHER PUBLICATIONS

"Everything you need to know about Hobart Mixers".«http://www.foodprocessr.com/top-list/hobart-mixer» (viewed 2019). (Year: 2019).*
(Continued)

*Primary Examiner* — Alexander M Weddle
(74) *Attorney, Agent, or Firm* — Steinfl + Bruno LLP

(57) ABSTRACT

A process for producing tyres including building a green tyre having two bead structures. Each bead structure includes a bead filler. The bead filler or another rigid component of the green tyre includes a final elastomeric compound produced by the following: feeding elastomeric polymer and reinforcement filler to a first batch mixing device; mixing and dispersing the reinforcement filler in the elastomeric polymer and unloading the obtained elastomeric compound; feeding the obtained elastomeric compound, along with at least 5 phr of reinforcement resin, to a continuous mixing device of intermeshing and co-rotating twin-screw or multi-screw type or of planetary type; mixing the reinforcement resin in the elastomeric compound and unloading the obtained elastomeric compound; and feeding the obtained elastomeric compound along with the components capable (Continued)

Figure 1:
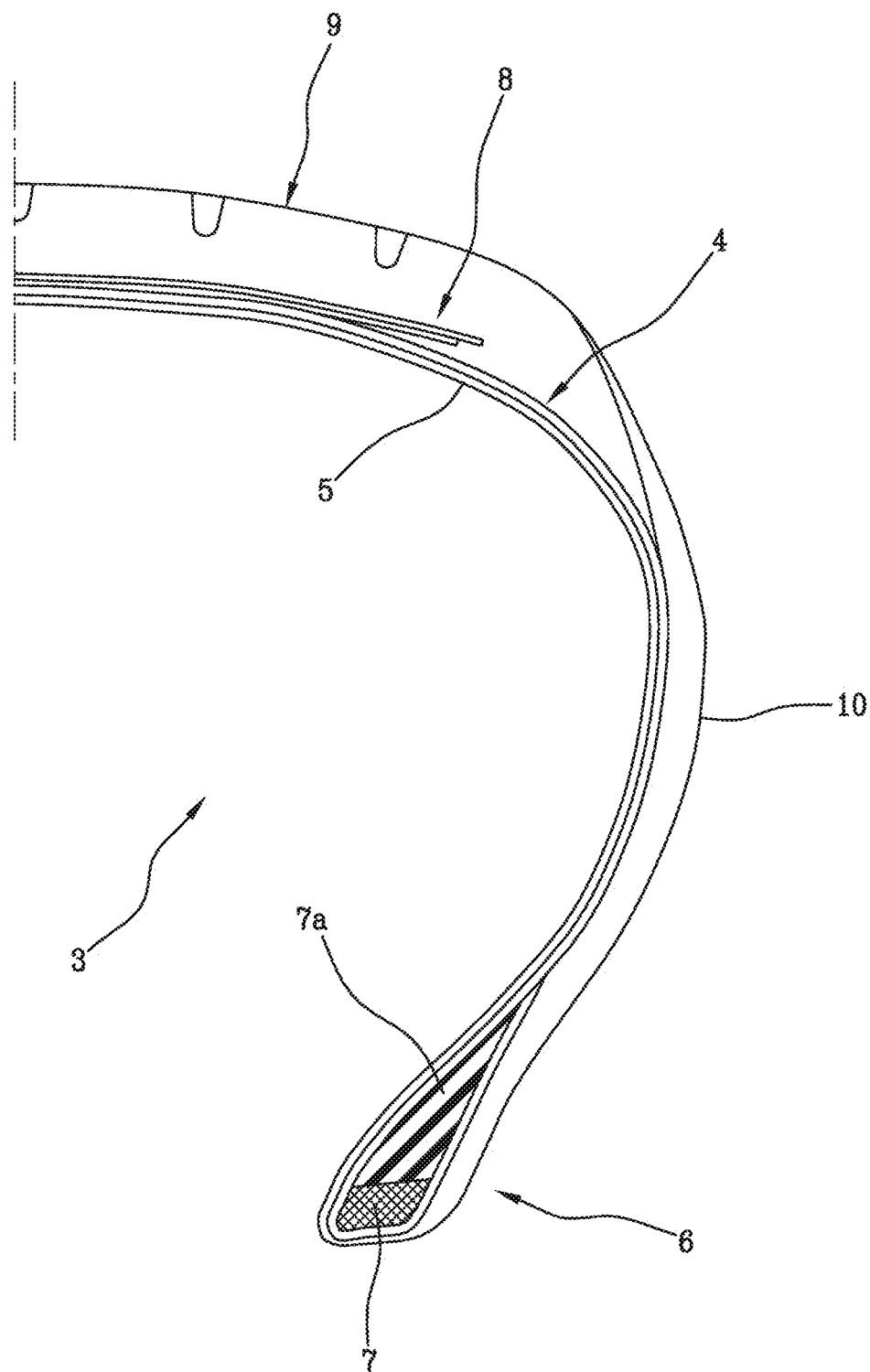

of facilitating the cross-linking to a second batch mixing device and mixing to obtain the final elastomeric compound. The first and second batch mixing device have two counterrotating rotors.

26 Claims, 2 Drawing Sheets

(51) Int. Cl.
| | |
|---|---|
| B29D 30/06 | (2006.01) |
| B29D 30/48 | (2006.01) |
| B29D 30/08 | (2006.01) |
| B29B 7/48 | (2006.01) |
| B29B 7/74 | (2006.01) |
| B29B 7/18 | (2006.01) |
| B29B 7/46 | (2006.01) |
| B29K 21/00 | (2006.01) |
| B29C 48/465 | (2019.01) |
| B29C 48/535 | (2019.01) |
| B29C 48/35 | (2019.01) |
| B29C 48/625 | (2019.01) |
| B29C 48/385 | (2019.01) |
| B29C 48/37 | (2019.01) |
| B29C 48/30 | (2019.01) |
| B29C 48/07 | (2019.01) |
| B29C 48/57 | (2019.01) |
| B29C 48/285 | (2019.01) |
| B29C 48/00 | (2019.01) |

(52) U.S. Cl.
CPC ............... *B29B 7/465* (2013.01); *B29B 7/48* (2013.01); *B29B 7/7461* (2013.01); *B29B 7/90* (2013.01); *B29D 30/0601* (2013.01); *B29D 30/48* (2013.01); *B29C 48/022* (2019.02); *B29C 48/07* (2019.02); *B29C 48/287* (2019.02); *B29C 48/2888* (2019.02); *B29C 48/30* (2019.02); *B29C 48/35* (2019.02); *B29C 48/37* (2019.02); *B29C 48/385* (2019.02); *B29C 48/465* (2019.02); *B29C 48/535* (2019.02); *B29C 48/57* (2019.02); *B29C 48/625* (2019.02); *B29D 2030/084* (2013.01); *B29D 2030/481* (2013.01); *B29K 2021/00* (2013.01)

(58) Field of Classification Search
CPC ......... B29B 7/90; B29C 48/022; B29C 48/07; B29C 48/287; B29C 48/2888; B29C 48/30; B29C 48/35; B29C 48/37; B29C 48/385; B29C 48/465; B29C 48/535; B29C 48/57; B29C 48/625; B29D 2030/084; B29D 2030/481; B29D 30/0601; B29D 30/08; B29D 30/48; B29K 2021/00
USPC ........................................................ 264/326
See application file for complete search history.

(56) References Cited

U.S. PATENT DOCUMENTS

| | | | |
|---|---|---|---|
| 4,197,381 A | 4/1980 | Alia | |
| 4,359,354 A | 11/1982 | Bohm | |
| 4,548,999 A | 10/1985 | Steinberger et al. | |
| 4,647,328 A | 3/1987 | Rhee | |
| 4,687,794 A | 8/1987 | Huddleston et al. | |
| 4,692,352 A | 9/1987 | Huddleston | |
| 4,863,366 A | 9/1989 | Kim | |
| 4,877,468 A | 10/1989 | Siegenthaler | |
| 4,897,236 A | 1/1990 | Rabiger et al. | |
| 5,011,291 A | 4/1991 | Peter | |
| 5,127,811 A | 7/1992 | Trethowan | |
| 5,198,171 A | 3/1993 | Kasahara et al. | |
| 5,401,789 A | 3/1995 | Wolff et al. | |
| 5,496,107 A | 3/1996 | Peter | |
| H1600 H | 10/1996 | Imfeld et al. | |
| 5,609,883 A * | 3/1997 | Valentine | A61K 9/2095 424/464 |
| 5,626,420 A | 5/1997 | Deal et al. | |
| 5,696,197 A | 12/1997 | Smith et al. | |
| 5,711,904 A | 1/1998 | Eswaran et al. | |
| 5,780,537 A | 7/1998 | Smith et al. | |
| 5,863,117 A | 1/1999 | Gheorghita | |
| 5,967,211 A | 10/1999 | Lucas et al. | |
| 6,204,321 B1 | 3/2001 | Lanoye | |
| 6,258,302 B1 | 7/2001 | Nesbitt | |
| 6,554,041 B1 | 4/2003 | Ohki et al. | |
| 6,726,352 B2 | 4/2004 | Proni et al. | |
| 6,730,710 B2 | 5/2004 | Mori et al. | |
| 6,736,176 B2 | 5/2004 | Teratani | |
| 6,753,079 B2 | 6/2004 | Husemann et al. | |
| 8,858,852 B2 | 10/2014 | Testi et al. | |
| 2002/0016404 A1 | 2/2002 | Mabry et al. | |
| 2002/0042465 A1 | 4/2002 | Migliarini | |
| 2002/0042479 A1 | 4/2002 | Nanni et al. | |
| 2003/0212185 A1* | 11/2003 | Vasseur | B60C 1/0016 524/492 |
| 2003/0221760 A1 | 12/2003 | Grimberg et al. | |
| 2004/0031550 A1 | 2/2004 | Kanenari et al. | |
| 2004/0142621 A1 | 7/2004 | Carroll et al. | |
| 2004/0147669 A1 | 7/2004 | Someno et al. | |
| 2004/0192816 A1 | 9/2004 | Galimberti et al. | |
| 2004/0222543 A1 | 11/2004 | Innerebner et al. | |
| 2005/0040555 A1 | 2/2005 | Caretta et al. | |
| 2005/0049362 A1 | 3/2005 | Buckley et al. | |
| 2005/0087906 A1 | 4/2005 | Caretta et al. | |
| 2005/0143514 A1 | 6/2005 | Guerin | |
| 2006/0030658 A1 | 2/2006 | Sandstrom | |
| 2006/0081325 A1 | 4/2006 | Hayashi et al. | |
| 2006/0111475 A1 | 5/2006 | Mabry et al. | |
| 2006/0169393 A1 | 8/2006 | Botts et al. | |
| 2006/0293457 A1 | 12/2006 | Nadella et al. | |
| 2007/0055008 A1 | 3/2007 | Nanni et al. | |
| 2007/0100085 A1 | 5/2007 | Kim et al. | |
| 2008/0242771 A1 | 10/2008 | Kulbaba et al. | |
| 2008/0275187 A1 | 11/2008 | Tsou et al. | |
| 2011/0067800 A1 | 3/2011 | Bottomley et al. | |
| 2012/0000584 A1 | 1/2012 | Hahn et al. | |
| 2012/0025430 A1 | 2/2012 | Testi et al. | |
| 2012/0073725 A1* | 3/2012 | Lo Presti | B29D 30/0601 152/552 |
| 2012/0161366 A1 | 6/2012 | Burg et al. | |

FOREIGN PATENT DOCUMENTS

| | | |
|---|---|---|
| EP | 0277558 A2 | 8/1988 |
| EP | 0814113 A2 | 12/1997 |
| EP | 0928680 A1 | 7/1999 |
| EP | 0928702 A1 | 7/1999 |
| EP | 0972790 A1 | 1/2000 |
| EP | 1514901 A1 | 3/2005 |
| EP | 1757420 A1 | 2/2007 |
| JP | S51-11853 A | 1/1976 |
| JP | S59-230029 A | 12/1984 |
| RU | 2067986 C1 | 10/1996 |
| SU | 1024295 A | 6/1983 |
| WO | 97/09162 A1 | 3/1997 |
| WO | 2001/036185 A1 | 5/2001 |
| WO | 2003/051596 A1 | 6/2003 |
| WO | 2004/007172 A1 | 1/2004 |
| WO | 2005/056664 A1 | 6/2005 |
| WO | 2007/050076 A1 | 3/2007 |
| WO | 2009/062525 A1 | 5/2009 |
| WO | WO-2009062525 A1 * | 5/2009 ............ B29B 7/005 |
| WO | 2010/073275 A1 | 7/2010 |
| WO | WO-2013035354 A1 * | 3/2013 ......... H01L 23/3737 |

(56) References Cited

FOREIGN PATENT DOCUMENTS

| WO | 2014/068451 | A1 | | 5/2014 | |
| WO | WO-2014068451 | A1 | * | 5/2014 | ............... C08K 3/34 |
| WO | 2014/191953 | A1 | | 12/2014 | |

OTHER PUBLICATIONS

Dickstein, Robert, Technical Rubber Course, Mixing Technology and Machinery, 2003. 73 pgs.
International Search Report for International Application PCT/EP2007/009798 filed on behalf of Pirelli Tyre S.P.A. on Nov. 13, 2007, dated Oct. 31, 2008. 6 pgs.
Written Opinion for International Application PCT/EP2007/009798 filed on behalf of Pirelli Tyre S.P.A. on Nov. 13, 2007, dated Oct. 31, 2008. 14 pgs.
International Preliminary Report on Patentability PCT/EP2007/009798 filed on behalf of Pirelli Tyre S.P.A. on Nov. 13, 2007, dated May 18, 2008. 15 pgs.
International Search Report for International Application PCT/EP2014/061814 filed on behalf of Pirelli Tyre S.P.A. on May 29, 2014, dated Sep. 18, 2014. 5 pgs.
Written Opinion for International Application PCT/EP2014/061814 filed on behalf of Pirelli Tyre S.P.A. on May 29, 2014, dated Sep. 18, 2014. 5 pgs.
International Preliminary Report on Patentability for International Application PCT/EP2014/061814 filed on behalf of Pirelli Tyre S.P.A. on May 29, 2014, dated Dec. 1, 2015. 6 pgs.
Final Office Action for U.S. Appl. No. 12/742,476, filed behalf of Alan Bottomley et al., filed May 12, 2010, dated Apr. 20, 2017. 35 pgs.
Non-Final Office Action for U.S. Appl. No. 12/742,476, filed on behalf of Alan Bottomley et al., filed May 12, 2010, dated Oct. 25, 2016. 50 pgs.
Non-Final Office Action for U.S. Appl. No. 12/742,476, filed on behalf of Alan Bottomley et al., filed May 12, 2010, dated Nov. 12, 2013. 50 pgs.
Final Office Action for U.S. Appl. No. 12/742,476, filed on behalf of Alan Bottomley et al., filed May 12, 2010, dated Feb. 26, 2016. 38 pgs.
Non-Final Office Action for U.S. Appl. No. 12/742,476, filed on behalf of Alan Bottomley et al., filed May 12, 2010, dated Sep. 10, 2012. 24 pgs.
Restriction Requirement for U.S. Appl. No. 12/742,476, filed on behalf of Alan Bottomley et al., filed May 12, 2010, dated Jun. 20, 2012. 9 pgs.
EPO Communication pursuant to Article 94(3) EPC for European Patent Application No. 15801257.5, filed Nov. 17, 2015, on behalf of Pirelli Tyre S.P.A. dated Aug. 30, 2018. 5 pages.
First Office Action for Chinese Patent Application No. 201580071581.0, filed Jun. 29, 2017, on behalf of Pirelli Tyre S.P.A. dated Nov. 2, 2018. 13 pages. (English Translation + Chinese Original).
Kumar, et al. "Vulcanization of Rubber: How to Alter Molecular Structure and Influence Physical Properties" *Resonance—Journal of Science Education* (Apr. 1997), 2(4): 55-59.
International Search Report for International Application PCT/IB2015/058866 filed on behalf of Pirelli Tyre S.P.A. on Nov. 17, 2015, dated Feb. 18, 2016. 5 pgs.
Written Opinion for International Application PCT/IB2015/058866 filed on behalf of Pirelli Tyre S.P.A. on Nov. 17, 2015, dated Feb. 18, 2016. 6 pgs.
Klein, J. The Hub, Volume Forty-Six, Trade News Publishing Co, 1905.
Non-Final Office Action for U.S. Appl. No. 12/742,476, filed May 12, 2010 on behalf of Alan Bottomley et al. dated Jan. 16, 2018. 33 pages.
Dickstein, R., "Technical Rubber Course", Mixing Technology and Machinery, 73 pages, (2003).
Ellwood, H., "A Tale of Continuous Development", Mixing Developments, European Rubber Journal, pp. 26-28, (1987).
"Seminar on Energy Conservation in Rubber Industry", Sponsored by United Nations Industrial Development Organization (UNIDO), Organized by the Energy Conservation Center (ECC), Hanoi, 57 pages, (1998).
Schmarz, O., et al., "The Processing of Plastic", Professiva, Saint-Petersburg, pp. 24-25, (2005) (In Russian). The below Russian Office Action 2010123880/5 makes reference to Schmarz, p. 24, figure 2.4 to support the assertion that "The use of batch mixing devices as a mixing apparatus is widely known". See p. 2 of the English translation of the Russian Office Action which provides a concise explanation of its relevance.
Office Action for Russian Patent Application 2010123880/5(034086) filed Jun. 11, 2010 on behalf of Pirelli Tyre S.P.A. Issue Date: Oct. 13, 2011. 9 pages, (English translation + Russian original).

* cited by examiner

PROCESS FOR PRODUCING TYRES

CROSS REFERENCE TO RELATED APPLICATIONS

The present application is the U.S. national stage of International Patent Application PCT/IB2015/058866 filed internationally on Nov. 17, 2015, which, in turn, claims priority to Italian Patent Application No. MI2014A002259 filed on Dec. 29, 2014.

The object of the present invention is a process for producing tyres for vehicle wheels, for example for cars, motorcycles or heavy vehicles.

A tyre for vehicle wheels generally comprises a carcass structure comprising at least one carcass ply having mutually-opposite end flaps engaged with respective annular anchoring structures, integrated in the zones usually identified with the name "bead structures".

An anti-abrasive strip is typically arranged in an external position of each bead structure. Preferably each anti-abrasive strip is arranged at least in axially external position with respect to the bead structure, being extended at least between the sidewall and the portion radially smaller than the bead structure. Preferably the anti-abrasive strip is arranged in a manner so as to wind along the axially internal and external and radially smaller zones of the bead structure in a manner so as to be interposed between the latter and the rim of the wheel when the tyre is mounted on the rim.

The carcass structure is typically associated with a belt structure, and a tread band made of elastomeric material is associated in radially external position with respect to the belt structure.

Respective sidewalls made of elastomeric material are also applied in axially external position on the lateral surfaces of the carcass structure, each being extended from a respective lateral edge of the tread band up to the respective annular anchoring structure to the beads.

The tyre, if this is a self-supporting tyre, can also include a support structure capable of supporting the load of the vehicle under a total or considerable loss of pressure. In particular, a sidewall insert can be associated with each sidewall. In each side of the tyre, the sidewall insert is radially extended between the respective bead structure and the corresponding lateral edge of the tread band Each sidewall insert can be made of one or more portions and is situated in an axially internal or external position with respect to the carcass ply.

Following the building of the green tyre, a moulding and vulcanisation treatment is generally executed, aimed to determine the structural stabilisation of the tyre by means of cross-linking of the elastomeric compounds employed for the various components, as well as impart a desired tread design on the tread band and impart possible distinctive graphic marks on the sidewalls.

The elastomeric compounds comprise at least one elastomeric polymer and at least one reinforcement filler (hereinbelow also termed 'filler') and also additives capable of facilitating the cross-linking. Due to the presence of such additives, the compounds can be cross-linked by means of heating, so as to form the final manufactured product.

The tyres for vehicle wheels can be subjected, in the different manoeuvres, to stresses of circumferential type, transverse type or the two combined, even of considerable size. Such stresses are transmitted from the rim of the wheel to the tyre, and vice versa, through the bead structures of the tyre. For such reason, it is known to provide the tyres with rigid bead structures; for even more reason, it is known to provide such rigid bead structures for high-performance tyres and for heavy load vehicle tyres.

In particular the bead filler constitutes a transition element of the bead structure between the annular anchoring elements having a high rigidity typical of a metal material (e.g. steel) and the sidewall of the tyre, which has much lower rigidity.

Having considered its position and function, the bead filler (along with, typically, the coating, or in jargon rubber-coating, of the metallic annular anchoring elements) typically comprises an elastomeric material having rigidity values such to allow it to effectively exert the aforesaid transition function.

Analogously, also the anti-abrasive strip and the sidewall insert for self-supporting tyres typically require high rigidity values.

In order to obtain the desired rigidity values, it is possible to introduce at least one resin with reinforcing action as ingredient of the cross-linkable elastomeric compound which, following cross-linking—typically termed 'vulcanisation' in the case of elastomeric polymers—forms the cross-linked elastomeric compound constituting the elastomeric material of the bead filler.

With the term 'resin with reinforcing action' or 'reinforcement resin' (or 'reinforcing resin', or 'hardening resin'), or for the sake of brevity hereinbelow also only 'resin', it is intended a typically but not exclusively polymer material susceptible of hardening following an irreversible chemical transformation (cross-linking) that transforms it into a rigid, non-meltable and insoluble material.

The document WO 2014/068451 A1 describes a tyre for vehicle wheels comprising reinforcement annular structures which comprise a cross-linked elastomeric material obtained by means of cross-linking of a cross-linkable elastomeric compound comprising inorganic fibres of silicates of magnesium and/or aluminium of nanometric size, e.g. sepiolite.

The document WO 2009/062525 A1 describes a process for producing an elastomeric compound comprising at least one mixing step executed in a batch mixing device, and at least one mixing step executed in a continuous mixing device, the resulting elastomeric compound being used in the building of tyres.

Such document WO 2009/062525 A1 describes a process for producing elastomeric compound where all the components of the elastomeric compound are fed to a batch mixing device, for example an internal mixer of Banbury® type or an open mixer, and the elastomeric compound thus obtained is subsequently fed to a continuous mixing device without adding further components. In the case of the internal mixer, the mixing is executed in two different steps, the first step being a non-production step in which all the components, except those capable of facilitating the cross-linking (e.g. sulfur and accelerants) are fed to the batch mixing device, the second step being a production step in which the elastomeric compound obtained from the first step, along with the components capable of facilitating the cross-linking, are fed to the batch mixing device.

The document WO 2009/062525 A1 also describes an alternative process for producing an elastomeric compound, where all the components of the elastomeric compound, except those capable of facilitating the cross-linking, are fed to a batch mixing device, e.g. an internal mixer of Banbury® type, and the elastomeric compound thus obtained is subsequently fed to a continuous mixing device without adding further components. The elastomeric compound thus obtained is subsequently fed to a batch mixing device together with the components capable of facilitating the cross-linking.

The document WO 2009/062525 A1 describes a further alternative process for producing elastomeric compound, where all the components of the elastomeric compound, except those capable of facilitating the cross-linking, are fed to a batch mixing device, e.g. an internal mixer of Banbury® type. The elastomeric compound thus obtained, together with the components capable of facilitating the cross-linking, are subsequently fed to a continuous mixing device.

For the purpose of the present description and of the following claims, the term "batch mixing device" signifies a mixing device adapted to be periodically fed with the components of the elastomeric compound in predefined quantities (batches) and to mix them for a predetermined time period in a manner so as to obtain the elastomeric compound. At the end of the mixing step, the obtained elastomeric compound is completely unloaded from the mixing device in a single solution.

For the purpose of the present description and of the following claims, the term "continuous mixing device", or equivalently 'continuous mixer', signifies a mixer device suitable for receiving, in continuous feeding, the base ingredients (e.g., polymers, reinforcement fillers, plasticising agents, resins, etc.) of the elastomeric compound, typically by means of controlled metering feeders, to mix them in order to produce the elastomeric compound and to unload the elastomeric compound in a continuous flow (except for possible stops of the mixer device due to maintenance, or change of recipe of the elastomeric compound); this is contrast with the period loading/unloading of the batch mixing device. In the jargon of the field of mixers for elastomeric compounds, the continuous mixing device is sometimes indicated with the term 'mixing extruder', which is considered herein to be equivalent to 'continuous mixer'.

The continuous mixing device is capable of substantially mixing the base ingredients of an elastomeric compound, especially in cold feeding/metering conditions, and of masticating the elastomeric material, raising the temperature thereof so as to render it workable and plastic in order to facilitate the incorporation and/or distribution of the ingredients within the polymer matrix. The continuous mixer is thus mainly provided with mixing portions capable of conferring a high shear stress to the compound, with possible redistribution portions. The continuous mixer is also provided with conveyor portions capable of conveying the compound being processed from one longitudinal end to the other of the internal chamber.

Examples of continuous mixing devices are the continuous mixing devices of intermeshing and co-rotating twin-screw or multi-screw type (e.g. ring mixers), or of planetary type.

With the term 'mixing device of planetary type' it is intended a continuous mixing device having a central rotor and a plurality of satellite mixers, each of which, driven by the central rotor, rotates simultaneously around its axis and around the central rotor.

Both the batch mixing device and the continuous mixing device are capable of supplying sufficient energy to the elastomeric compound for mixing and dispersing the filler in the elastomeric polymer, even in the case of cold feeding, unlike other elastomeric compound handling devices, such as the conveyors and the devices for building a semi-finished element mentioned hereinbelow.

For the purpose of the present description and of the following claims, the term 'conveyor' signifies a device that continuously conveys the elastomeric compound through its length, and at the outlet such device confers to the compound a suitable shape for subsequent handling or storage. Examples of conveyors include the devices for unloading ('batch off') from the batch mixing devices. The conveyors typically comprise elements that mainly facilitate the axial movement of the material, such as the helical screws.

For the purpose of the present description and of the following claims, the term 'device for building a semi-finished element' signifies a device capable of being fed, e.g. continuously, with an elastomeric compound and of unloading a continuous strip of said elastomeric compound, conferring defined shape and size thereto, e.g. desired shape and size for the incorporation in the green tyre. Examples of devices for building a semi-finished element are the single-screw or twin-screw extruders (typically counter-rotating) having, at the outlet, an extrusion head or a rolling press.

From that stated above, it is understood that the conveyors and the semi-finished element building devices, while exerting a mild mixing action in particular conditions, are absolutely incapable of supplying sufficient energy to the elastomeric compound for dispersing the filler in the elastomeric polymer or for substantially mixing the components of an elastomeric compound so as to form a compound starting from its base ingredients, especially in cold feeding conditions, being limited to a transport and/or a shaping of the compound being fed.

The Applicant has addressed the problem of obtaining a greater rigidity of the elastomeric material of components of a tyre that require particular rigidity, without negatively affecting the other structural and/or workability characteristics, both during the preparation of the compound and during the building of the tyre.

For example, the Applicant has sought to avoid increasing the fragility of the resulting elastomeric material and/or to avoid increasing the viscosity of the elastomeric compound.

The Applicant has observed that the process for producing the elastomeric compound—with which, in the technical field, the rigid components such as the bead filler are obtained—uses a batch mixer, such as an open mixer of "open-mill" type or an internal mixer or the type with tangential rotors (Banbury®) or with intermeshing rotors (Intermix™). Typically, in a first step, all the ingredients of the compound, including the reinforcement resins and excluding the components capable of facilitating the cross-linking, are mixed in the batch mixer and are then unloaded and cooled. In a second mixing step, the compound thus obtained is once again introduced into a batch mixer (the same of the first step or a different one) where the components capable of facilitating the cross-linking are added together with possible other additives, in order to obtain, after mixing, the final compound.

The Applicant has experimentally found that the known production techniques do not provide satisfactory results in terms of physical-chemical characteristics, in particular the viscosity, of the final compound and/or in terms of physical-chemical and performance characteristics, in particular the rigidity, of the resulting elastomeric material of the rigid component.

The Applicant has instead experimentally found that by incorporating reinforcement resin, via continuously mixing in an intermediate mixing step between two batch mixing steps, it is possible to obtain high rigidity of the cross-linked material and simultaneously a decrease of the viscosity of the elastomeric compound before cross-linking.

Therefore, according to a first aspect, the present invention relates to a process for producing tyres comprising:

building a green tyre comprising two bead structures, each comprising a bead filler and annular anchoring structures, subjecting the green tyre to moulding and cross-linking in order to obtain a finished tyre;

wherein at least one rigid component of said green tyre selected from among said bead filler, a coating of said annular anchoring structures, an anti-abrasive strip and a sidewall insert, comprises a final elastomeric compound comprising at least one elastomeric polymer, at least one reinforcement filler, components capable of facilitating the cross-linking, and at least 5 phr of reinforcement resin.

Preferably said final elastomeric compound is produced by:

feeding at least the elastomeric polymer and the reinforcement filler to a first batch mixing device;

mixing and dispersing, in said first batch mixing device, said reinforcement filler in said elastomeric polymer, in a manner so as to obtain a first-phase elastomeric compound;

unloading said first-phase elastomeric compound from said first batch mixing device;

feeding said first-phase elastomeric compound, along with at least 5 phr of said reinforcement resin, to a continuous mixing device, said continuous mixing device being of intermeshing and co-rotating twin-screw or multi-screw type, or of planetary type, and mixing, in said continuous mixing device, said reinforcement resin in said first-phase elastomeric compound, in a manner so as to obtain an intermediate elastomeric compound, said mixing in said continuous mixing device being executed at a speed from about 40 revolutions per minute to about 400 revolutions per minute;

unloading said intermediate elastomeric compound from said continuous mixing device, feeding said intermediate elastomeric compound along with the components capable of facilitating the cross-linking to a second batch mixing device;

mixing, in said second batch mixing device, said components capable of facilitating the cross-linking with said intermediate elastomeric compound, in a manner so as to obtain said final elastomeric compound, wherein each of said first and second batch mixing device has two counter-rotating rotors and the mixing in said batch mixing devices is executed at a speed from about 5 revolutions per minute to about 80 revolutions per minute;

unloading said elastomeric compound from said second batch mixing device.

The term "phr", as is known in the art, signifies the parts by weight of a specific component of the elastomeric compound per 100 parts by weight of elastomeric polymer.

The term 'multi-screw' referred to the continuous mixing device refers to a number of screws greater than two.

The Applicant has found that the elastomeric compound thus obtained, with which the rigid component (e.g. the bead filler) is obtained, comprising at least 5 phr of reinforcement resin, upon cross-linking has an increase of the rigidity without incurring problems of increased fragility or lesser workability of the non-vulcanised elastomeric compound.

Rather, the Applicant has surprisingly found that the aforesaid process simultaneously caused a decrease of the viscosity of the final non-cross-linked elastomeric compound and hence an increase of the processability thereof.

Such result was even more surprising for the Applicant after the same had experimentally found—before arriving at the present solution—that a simple improved dispersion of the filler in the compound was not sufficient for such purpose.

The Applicant experimentally subjected the elastomeric compound with a reinforcement resin produced (in two steps) entirely in a batch mixer to a further (subsequent or intermediate) step of re-mixing, without adding components, both in a batch mixer and in a continuous mixer (as is taught for example in the abovementioned WO 2009/062525 A1). As discussed in more detail hereinbelow, the results were disappointing, since a slight decrease of the viscosity (according to the Applicant, due to an improved dispersion of the filler in the polymer) did not produce a considerable increase of the rigidity of the cross-linked material. According to the Applicant, without wishing to be linked to any interpretive theory, this was due to a non-optimal mixing of the reinforcement resin in the batch mixer which produces aggregates of reinforcement resin that cannot be reversibly resolved in subsequent mixing steps, whether in batch mixers or in continuous mixers.

In the present invention, however, at least a substantial part of the reinforcement resin is incorporated during an intermediate step of continuous mixing, and according to the Applicant this leads, in addition to an optimal dispersion of the filler in the elastomeric polymer, also to an improved dispersion of the resin in the compound and/or to an increased resin/reinforcement filler interaction. This in turn determines, after cross-linking, a better structured pattern that confers an increased rigidity modulus to the elastomeric material.

The present invention can provide for one or more of the following preferred embodiments.

The overall content of elastomeric polymer (100 phr) in said final elastomeric compound can be obtained by incorporating different elastomeric polymers.

Preferably said elastomeric polymer is selected from among diene elastomeric polymers and mono-olefin elastomeric polymers, or mixtures thereof.

A elastomeric diene can be selected, for example, from elastomeric polymers or copolymers, with an unsaturated chain having a glass transition temperature (Tg) generally below 20° C., preferably in the range from about 0° C. to about −110° C. These polymers or copolymers can be of natural origin or they can be obtained by means of polymerisation in solution, polymerisation in emulsion or polymerisation in gaseous phase of one or more conjugate diolefins, optionally mixed with at least one co-monomer selected from among monovinylarenes and/or polar co-monomers. Preferably, the obtained polymers or copolymers contain said at least one co-monomer selected from among monovinylarenes and/or polar co-monomers in a quantity of not more than 60% by weight. Examples of diene elastomeric polymers are the following: cis-1,4-polyisoprene (natural or synthetic rubber, preferably natural rubber), 3,4-polyisoprene, poly-1,3-butadiene (in particular, highly vinyl poly-1,3 butadiene having a content of 1,2-polymerised units, from about 15% to about 85% by weight), polychloroprene, isoprene/isobutene copolymers optionally halogenated, 1,3-butadiene/acrylonitrile copolymers, 1,3-butadiene/styrene copolymers, 1,3-butadiene/isoprene copolymers, isoprene/styrene copolymers, isoprene/1,3-butadiene/styrene terpolymers; or mixtures thereof.

As mono-olefin elastomeric polymers, these can for example be selected from among the following: ethylene copolymers with at least one alpha-olefin having from 3 to 12 carbon atoms, and optionally with a diene having from 4 to 12 carbon atoms; poly-isobutene, isobutene copolymers and at least one diene. The following are particularly preferred: ethylene/propylene copolymers (EPR); ethylene/propylene/diene terpolymers (EPDM); poly-isobutene; butyl rubbers; halobutyl rubbers; or mixtures thereof.

Preferably the overall content of reinforcement filler in said final elastomeric compound is greater than 10 phr, preferably greater than 30 phr, more preferably greater than or equal to 40 phr, and/or less than 120 phr, more preferably less than or equal to 100 phr.

Preferably, said reinforcement filler can be selected from among: carbon black, silica, alumina, aluminosilicates, calcium carbonate, kaolin or mixtures thereof.

Preferably the entire content of elastomeric polymer and/or of reinforcement filler of the final elastomeric compound is fed into said first batch mixing device.

Preferably, said final elastomeric compound comprises a quantity of components capable of facilitating the cross-linking greater than about 3.5 phr, more preferably greater than about 4 phr, and/or less than or equal to about 7.5 phr, more preferably less than or equal to about 7.

Preferably said components capable of facilitating the cross-linking comprise vulcanising agents selected for example from among sulfur, or molecules containing sulfur (sulfur donors), or mixtures thereof.

Preferably said components capable of facilitating the cross-linking comprise accelerant agents such as dithiocarbamates, guanidine, thiourea, thiazoles, sulfenamides, thiurams, amines, xanthates, or mixtures thereof.

Preferably the entire content of said components capable of facilitating the cross-linking of the final elastomeric compound is fed into said second batch mixing device.

Preferably, in addition to said elastomeric polymer, said reinforcement filler, said components capable of facilitating the cross-linking and said reinforcement resin, at least one of the following components can be present in the final elastomeric compound:
  activators, such as zinc compounds, and in particular ZnO, ZnCO$_3$, zinc salts of saturated and unsaturated fatty acids containing from 8 to 18 carbon atoms, such as zinc stearate, which are preferably formed in situ in the elastomeric compound from ZnO and fatty acid, and also BiO, PbO, Pb$_3$O$_4$, PbO$_2$, or mixtures thereof;
  additives selected on the basis of the particular application for which the composition is provided, such as antioxidants, anti-aging agents, plasticising agents (e.g. plasticising oils), bonding agents, anti-ozone agents, or mixtures thereof.

The overall content of reinforcement resin in said final elastomeric compound can be obtained by incorporating different reinforcement resins.

The reinforcement resins usable in the process according to the invention can be solids or liquids: the solid resins preferably have a softening point comprised between 60° C. and 160° C., preferably between 80° C. and 140° C. The liquid resins can be resins with low molecular weight with structure similar to that of the solid resins and with softening points substantially comprised between the ambient temperature (e.g. about 20° C. or 25° C.) and temperatures of −25° C. and less than −50° C. or even down to −80° C.

Preferably the entire content of reinforcement resin of the final elastomeric compound is solid resin. The Applicant has in fact found that the incorporation of the resin during an intermediate step of continuous mixing advantageously allows preventing the use of liquid reinforcement resin, for example used in order to obtain a plasticising effect on the raw materials in order to obtain an improved processability.

Preferably the entire content of solid reinforcement resin is fed into said continuous mixing device.

Preferably at least 70% of the, more preferably at least 80% of the, still more preferably the entire, content of reinforcement resin of the final elastomeric compound is fed into said continuous mixing device. Advantageously, in such a manner, it is possible to incorporate reinforcement resin, obtaining an optimal dispersion thereof in the compound and/or a high resin/reinforcement filler interaction. The Applicant has surprisingly verified that with the process of the present invention, it is possible to increase the rigidity of the cross-linked material even with a reduced resin content with respect to the prior art.

Preferably no other component, except for said reinforcement resin, is fed to said continuous mixing device. It is thus possible to avoid useless complication of the overall process.

Preferably the overall content of reinforcement resin in said final elastomeric compound is greater than or equal to 8 phr, more preferably greater than or equal to 10 phr, still more preferably greater than or equal to 14 phr, and/or less than or equal to 25 phr, more preferably less than or equal to 20 phr.

Preferably, said reinforcement resin comprises a methylene acceptor to be associated with at least one methylene donor compound as additive of the final elastomeric compound.

Advantageously, the final elastomeric compound (before the cross-linking) preferably comprises a quantity of methylene donor compound greater than about 1 phr, more preferably greater than about 3 phr.

Preferably, the quantity of methylene donor compound is less than about 15 phr, more preferably less than about 10 phr. Advantageously, the quantity of methylene donor compound is comprised between about 4 phr and about 8 phr.

Advantageously, the final elastomeric compound preferably comprises a quantity of methylene acceptor compound greater than about 5 phr, more preferably greater than about 8 phr. Preferably, the quantity of methylene acceptor compound is less than about 25 phr. Advantageously, the quantity of methylene acceptor compound is comprised between about 10 phr and about 20 phr.

According to a preferred embodiment, the methylene donor compound can for example be selected from among the following: hexamethylenetetramine (HMT); hexamethoxymethylmelamine (HMMM); formaldehyde; paraformaldehyde; trioxane; 2-methyl-2-nitro-1-propanal; substituted melamine resins, such as N-substituted oxymethylmelamine resins; glycoluril compounds such as tetramethoxymethyl glycoluril; urea-formaldehyde resins such as butylated urea-formaldehyde resins; or mixtures thereof. Hexamethylenetetramine (HMT) or hexamethoxymethylmelamine (HMMM) are particularly preferred.

According to a preferred embodiment, the methylene acceptor compound can for example be selected from among the following: resorcinol; catechol; hydroquinone; pyrogallol; phloroglucinol; 1-naphthol; 2-naphthol phenol resins, obtained from the condensation of a phenol, possibly substituted, with an aldehyde such as, for example, formaldehyde, acetaldehyde, furfural (e.g. resorcinol-formaldehyde resin); modified phenol resins; phenol resins derived from products of natural origin, typically from cashew oil or tallow oil; mixtures of the abovementioned compounds. The solid phenol resins of novolac type are particularly preferred.

Said methylene donor compound and said methylene acceptor compound can also be added to the elastomeric compound in precondensed form (condensed before being added to the elastomeric compound) as resorcinol-formaldehyde resin, substituted melamine resins such as N-substituted oxylmethymelamine resins, or mixtures thereof. Said precondensed resins are capable of self-cross-linking, since they contain various reactive groups.

The final elastomeric compound can comprise, in addition to or as a substitution of typical fillers (carbon black, silicas), inorganic fibres (i.e. elongated elements having a much higher size than the size of the cross section) of silicates of magnesium and/or aluminium, for example sepiolite fibres, palygorskite (also known as attapulgite) fibres or mixtures thereof, of nanometric size (i.e. with diameter less than 500 nm, more preferably less than 100 nm). Preferably, said final elastomeric compound comprises a quantity of inorganic fibres greater than about 5 phr, more preferably greater than about 8 phr, and/or less than about 25 phr, more preferably less than about 22 phr. The Applicant has surprisingly verified that it is possible to increase the rigidity of the cross-linked material by applying the method of the present invention also to the production of elastomeric compounds whose composition has already been designed (which includes said inorganic fibres) in order to obtain a rigid elastomeric material.

Preferably the first and the second batch mixing device are the same device.

Preferably said batch mixing device is selected from among internal mixers and open mixers. The internal mixers are particularly preferred.

Preferably said two counter-rotating rotors of the batch mixing device function tangentially with respect to each other or they are inter-meshing.

Usually, said batch mixing device comprises a mixing chamber housing said rotors therein, so as to mix the components introduced into the mixing chamber from the top thereof.

For this reason, said batch mixing device is usually equipped with a pneumatic or hydraulic cylinder arranged in the upper part of the mixing chamber and a piston movable upward in order to render the mixing chamber accessible, therefore allowing the introduction of the components through special load hoppers; such piston can also move downward, so as to exert a pressure on the material processed by the rotors which is situated above the latter. A hydraulic system arranged on the bottom of the mixing chamber allows the unloading of the elastomeric compound at the end of the mixing cycle by opening a suitable outlet.

Particular examples of internal mixers that can be advantageously used according to the present invention are those known under the trademark Banbury® or Intermix®, depending on whether the rotors function tangentially with respect to each other or if they are inter-meshing. The Banbury® mixer is particularly preferred.

Particular examples of open mixers which can be advantageously used according to the present invention are the following: open mixer, Z-shaped blade mixer. The open mixer is particularly preferred.

Preferably the mixing in said first and/or second batch mixing device is executed at a rotor speed greater than about 20 revolutions per minute and/or less than about 80 revolutions per minute, more preferably comprised between about 30 and about 70 revolutions per minute.

According to a preferred further embodiment, the mixing in said first and/or second batch mixing device is executed with a fill factor of the mixing chamber (the fill factor is the fraction of total free volume of the mixing chamber occupied by the material to be mixed) not greater than about 80%, preferably from about 55% to about 70%. If an overly high fill factor is selected, the lack of free volume prevents the movement of the material and the remixing, and a suitable mixing becomes impossible. Similarly, if a very small fill factor is selected, it is difficult to ensure suitable mixing, with high shear forces and adequate homogenization of the material in the mixing chamber.

Preferably said mixing in said first and second batch mixing device is executed in a time interval between 50 and 600 seconds, more preferably between 100 and 400 seconds.

Typically said screws, in the case of continuous twin-screw or multi-screw mixer, or satellites, in the case of continuous mixer of planetary type, comprise compression and/or shearing mastication elements and transport elements. In addition, the screws or satellites can comprise one or more toothed or gear elements; flow limiters; throttling devices. Preferably said continuous mixing device is of multi-screw (i.e. comprising more than two screws) type, such as the ring mixers (also termed 'ring extruders', for their capacity to extrude the produced elastomeric compound) having at least four screws, typically ten or twelve, arranged equidistant on a rim.

Preferably said continuous mixing device is of self-cleaning type, i.e. the mixer elements of each screw are substantially completely intermeshing with the mixer elements of the adjacent rotating screw, thus allowing the self-cleaning of the device.

Preferably said mixing in said continuous mixing device is executed at a specific energy greater than or equal to about 0.1 kWh/kg, more preferably greater than or equal to about 0.2 kWh/kg, and/or less than or equal to about 0.6 kWh/kg, more preferably less than or equal to about 0.4 kWh/kg.

Preferably said mixing in said continuous mixing device is executed at a speed of screws, in the case of twin-screw and multi-screw device, or of central rotor, in the case of mixer of planetary type, ranging from about 60 revolutions per minute to about 300 revolutions per minute.

Preferably the process also comprises cooling said first-phase elastomeric compound to a temperature from about 15° C. to about 40° C., more preferably from about 20° C. to about 30° C., before feeding it to said continuous mixing device.

Preferably the process also comprises cooling said intermediate elastomeric compound to a temperature from about 15° C. to about 40° C., preferably from about 20° C. to about 30° C., before feeding it to said second batch mixing device.

According to a particular embodiment, the first-phase elastomeric compound is fed to a conveyor device before being fed to said continuous mixing device. The feeding to said conveyor can allow controlling the speed of feeding of the first-phase elastomeric compound towards said continuous mixing device.

Preferably, said conveyor is of helical single-screw type or counter-rotating helical twin-screw type. Preferably the speed of said screw or said screws of the conveyor is comprised between 10 rpm and 60 rpm, more preferably between 20 rpm and 35 rpm.

According to a further embodiment, said first batch mixing device is an internal mixer and said second batch mixing device is an open mixer.

According to a further embodiment, said final elastomeric compound is fed to a semi-finished product building device, where it is shaped into a strip of elastomeric compound having size suitable for the incorporation in the green tyre as bead filler. The device for building a semi-finished product can be selected from among those known in the art, such as rolling press devices or extruders provided with an extrusion head.

Figure 2:
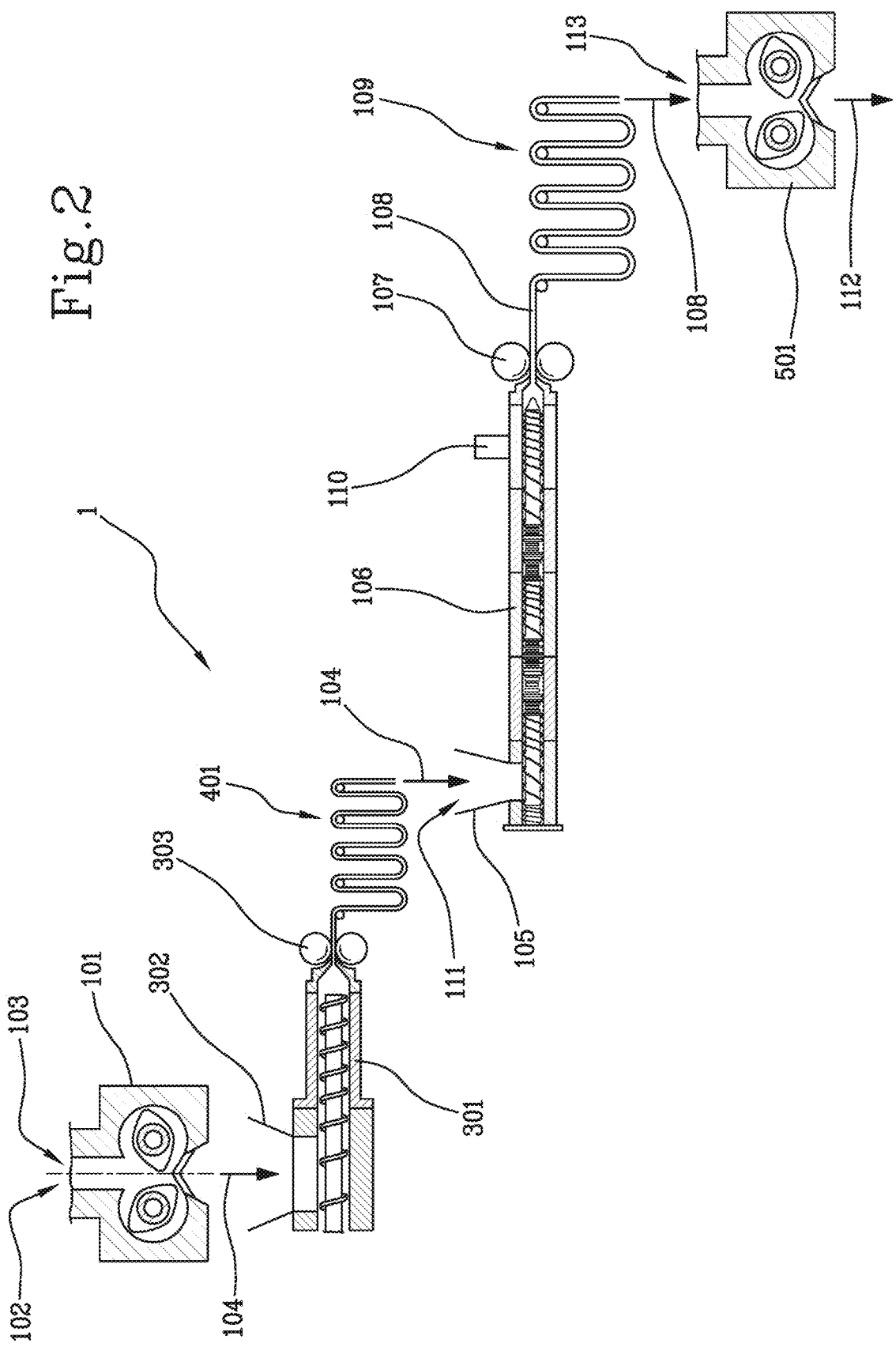

The present invention will be illustrated in further detail by means of exemplifying embodiments, with reference to the enclosed figures, in which:

FIG. 1 schematically shows, in half-section, a tyre for vehicle wheels obtained according to the present invention;

FIG. 2 is a scheme of an exemplifying plant for producing an elastomeric compound according to the present invention.

FIG. 1 shows, as an example, a tyre 3 produced with the process according to the present invention The tyre 3 essentially comprises at least one carcass ply 4 preferably internally coated with a layer of impermeable elastomeric material or so-called liner 5, two so-called "beads" 6 integrating respective annular anchoring structures 7 associated with a respective bead filler 7*a* and engaged with the circumferential edges of the carcass ply 4. Typically the annular anchoring structures 7 comprise metallic elements (for example the so-called 'bead cores') coated with the elastomeric material produced according to the present invention.

The tyre 3 also comprises typically a belt structure 8 applied in radially external position with respect to the carcass ply 4, a tread band 9 applied in radially external position with respect to the belt structure 8, in a so-called crown zone of the tyre 3, and two sidewalls 10 applied in laterally opposite positions on the carcass ply 4, each at a lateral zone of the tyre 3, extended from the corresponding bead 6 to the corresponding lateral edge of the tread band 9.

With reference to FIG. 2, reference number 1 overall indicates a plant for producing elastomeric compound in accordance with the present invention.

The plant 1 for producing an elastomeric compound includes an internal batch mixing device 101 (e.g. a Banbury® mixer) into which at least the elastomeric polymers 102 and the reinforcement fillers 103 are fed.

After the mixing has been executed, the obtained first-phase elastomeric compound 104 is fed to the continuous mixing device 106 (e.g. an intermeshing and co-rotating twin-screw self-cleaning extruder) through a feed hopper 105.

According to the embodiment of FIG. 2, the first-phase elastomeric compound 104 is unloaded from the internal batch mixer 101 to an optional conveyor 301 (e.g. helical single-screw extruder) through a feed hopper 302.

The first-phase elastomeric compound 104 is delivered by the conveyor 301, for example in the form of a continuous strip or sheet, pumping it through a roller opening or rolling press 303, e.g. by means of a gear pump (not represented in FIG. 2).

Alternatively (not shown in FIG. 2), the conveyor 301, rather than the roller opening 303, can be equipped with:

an extrusion opening equipped with a perforated extrusion plate equipped with knives, for the purpose of obtaining the first-phase elastomeric compound in the form of a subdivided product, before feeding it to the continuous mixer 106 (subject to possible storage);

an open mouth for the purpose of allowing the first-phase elastomeric compound to slide directly in the continuous mixer.

Alternatively, the conveyor 301 can be substituted with an open mixer (not shown in FIG. 2).

Alternatively, an open mixer can be arranged between the internal batch mixer 101 and the conveyor 301 (not shown in FIG. 2).

According to the particular embodiment of FIG. 2, the first-phase elastomeric compound 104 is cooled at the outlet of the conveyor 301, preferably at ambient temperature, by passing it through a cooling device 401 before feeding it to the continuous mixer device 106. Said cooling can be useful for the purpose of increasing the viscosity of the first-phase elastomeric compound before feeding it to said continuous mixer in order to allow an improved mixing of the first-phase elastomeric compound in said continuous mixer 106.

Alternatively (not shown), the first-phase elastomeric compound 104, at the outlet of the conveyor 301, after having been cooled by passing through the cooling device 401, can be transformed into a subdivided product by means of a cutting device (e.g. rolling mill equipped with rotating blades) before being fed to the continuous mixer 106 (subject to possible storage). Preferably, in this case, the feeding to the continuous mixer 106 can be controlled by means of feeders (volumetric feeders or loss-in-weight feeders) (not shown in FIG. 2).

In accordance with the present invention, at least 5 phr, preferably at least 8 phr, of reinforcement resin 111 is fed to the continuous mixing device 106 together with the first-phase elastomeric compound 104.

The continuous mixer 106 of FIG. 2 shows only one feed hopper 105. Nevertheless, more than one feed hopper (not shown in FIG. 2), can be present on the mixer 106. In addition, the continuous mixer 106 can be equipped with gravimetrically-controlled feed pumps (not shown in FIG. 2) which are useful for introducing liquid components, such as plasticising oils, into the mixer extruder.

The continuous mixer device 106 can optionally be equipped with one or more degassing units 110 for allowing the exit of the gases that can be developed during the mixing of the elastomeric compound.

After the mixing has been executed, and in particular after the reinforcement resin has been dispersed in the first-phase elastomeric compound in the continuous mixing device, an intermediate elastomeric compound 108 is unloaded from the continuous mixer device 106, for example in the form of a continuous strip, pumping it through a roller opening or rolling press 107, e.g. by means of a gear pump (not shown in FIG. 2).

Alternatively, the intermediate elastomeric compound 108 can be transformed into a subdivided product by pumping it through an extrusion opening (not shown in FIG. 2) arranged at the head of the continuous mixer, said extrusion opening being equipped with a perforated extrusion plate equipped with knives, by means of a gear pump (not shown in FIG. 2). The product obtained in subdivided form is subsequently cooled, preferably at ambient temperature, for example by conveying it towards a cooling device (not shown in FIG. 2).

The intermediate elastomeric compound 108 is fed to a second internal batch mixing device 501 (e.g. a Banbury® mixer). In accordance with the present invention, together with the intermediate elastomeric compound, also the components capable of facilitating the cross-linking 113 are fed to said second internal batch mixer 501.

According to the particular embodiment of FIG. 2, the intermediate elastomeric compound 108 is cooled, preferably at ambient temperature, by making it pass through a cooling device 109 before being fed to said second internal batch mixer 501. Said cooling can be useful for the purpose of increasing the viscosity of the intermediate elastomeric compound before providing it to said second internal batch mixer 501, therefore allowing an improved mixing of the intermediate elastomeric compound in said second internal mixer 501.

Alternatively (not shown in FIG. 2), the intermediate elastomeric compound 108 can be directly fed, without being cooled, to said second internal batch mixer 501.

Alternatively (not shown in FIG. 2), the intermediate elastomeric compound 108 can be obtained in the form of a subdivided product, as described above and subsequently fed to said second internal batch mixer 501.

In the second batch mixing device the components capable of facilitating the cross-linking are mixed and dispersed in the intermediate elastomeric compound, in a manner so as to obtain the final elastomeric compound 112 useful for incorporation in the bead filler of the green tyre, upon suitable shaping.

The final elastomeric compound 112 is then unloaded from said second batch mixing device 501, preferably by using a conveyor, not shown, combined with the second mixer 501 as described above with reference to the conveyor 301. The final elastomeric compound 112 is typically unloaded from the conveyor in sheet form, pumping it through an extrusion opening or a roller opening (not shown).

Usually, the obtained sheet is subsequently subjected to a cooling treatment, usually by means of water and/or forced air. The sheet thus treated is then usually arranged on benches or reels, while awaiting further processing.

Typically the final elastomeric compound 112 is fed to a device for building a semi-finished element (not shown in FIG. 2), for example a single-screw short cylinder extruder with hot feeding, in a manner so as to obtain the bead filler ready for incorporation in the green tyre.

The present invention will be further illustrated hereinbelow by means of a number of test examples, which are given for merely exemplifying purposes and without any limitation of this invention.

EXAMPLES 1-6

Preparation of the Elastomeric Compounds

Tables 1 and 2 report the recipe of the components mixed in the batch mixer in the first step and in the final step, respectively, for all the examples 1-6 (the quantities are given in phr).

TABLE 1

| COMPONENT | phr |
| --- | --- |
| high cis polybutadiene, SKD-neodymium, Nizhnekamsk | 30 |
| high cis-1,4-polyisoprene synthetic rubber, SKI-3, Nizhnekamsk | 70 |
| mineral oil, MES (Mild Extraction Solvate), ENI SPA | 2 |
| Carbon black, N375, Cabot | 62 |
| Stearic acid, Sogis | 2 |
| Zinc oxide, Zincol Ossidi | 8 |
| bonding tertbutylphenol resin, Koresin, Basf | 2 |

TABLE 2

| COMPONENT | phr |
| --- | --- |
| 50% Silane TESPT (bis[3-(triethoxysilyl)propyl]tetrasulfide) supported on carbon black, X 50-S, Evonik Industries | 3 |
| 65% HMMM hexamethoxymethylmelamine (65%) on inert carrier, Cyrez 964 P.C., Cytec | 8 |
| CTP cyclohexylthiophthalimide, Vulkalent G, Lanxess | 0.3 |
| TBBS:N-tert-butyl-2-benzothiazylsulfenamide, Vulkacit ® NZ/EG C, Lanxess; | 1.5 |
| Sulfur, Redball Superfine, International Sulphur Inc. | 8 |

Example 1

Reference 1

First Step

All the components listed in Table 1, with the addition of 18 phr of reinforcement resin (4 phr of liquid reinforcement phenol resin (CELLOBOND J 3111 L, Momentive Specialty Chemicals UK Limited) and 14 phr of solid reinforcement phenol resin (DUREZ 12686, Sumitomo Bakelite Europe)), were mixed together in a Banbury® mixer (model F270), operating at the following work conditions:
mixing time: 270 seconds;
fill factor: 70%;
rotor speed: 60 revolutions per minute;
unloading temperature: 160° C.

Second Step

The elastomeric compound obtained in the first step, cooled at ambient temperature (23° C.), along with all the components of Table 2, were fed into a Banbury® mixer (model F270) and a further mixing was executed, operating at the following work conditions:
mixing time: 180 seconds;
fill factor: 70%;
rotor speed: 20 revolutions per minute;
unloading temperature: 90° C.

The elastomeric compound unloaded from the Banbury® mixer was subsequently cooled at ambient temperature (23° C.).

Example 2

Comparative 1

Like Example 1 with additionally, between the first and the second step, an intermediate step in which the elastomeric compound obtained in the first step was cooled at ambient temperature (23° C.) and was subsequently fed into a Banbury® mixer (model F270). A further mixing was executed, without adding any further component, operating at the following work conditions:
mixing time: 150 seconds;
fill factor: 70%;
rotor speed: 35 revolutions per minute;
unloading temperature: 120° C.

The elastomeric compound thus obtained was then subjected to the aforesaid second step of Example 1.

Example 3

Comparative 2

Like Example 1 with additionally, between the first and the second step, an intermediate step in which the elastomeric compound obtained in the first step was cooled at ambient temperature (23° C.) and was subsequently fed to an intermeshing and co-rotating twin-screw mixer Maris TM92HT having nominal screw diameter of 92 mm and L/D ratio of 32. A further mixing was executed, without adding any further component, operating at the following work conditions:
feeding speed: 200 kg/h;
speed of the double screw: 100 revolutions per minute;
temperature profile: 40-50-60-50-20-10-10-10° C.
specific energy: 0.3 kWh/kg
temperature of elastomeric compound measured at the outlet of the extruder: 115° C.

The elastomeric compound thus obtained was then subjected to the aforesaid second step of Example 1.

Example 4

Comparative 3

Like Example 1 with additionally, after the second step, a further step in which the elastomeric compound obtained in the second step was cooled to ambient temperature (23° C.) and was subsequently fed to the aforesaid intermeshing and co-rotating twin-screw mixer Maris TM92HT. A further mixing was executed, without adding any further component, operating at the following work conditions:
 feeding speed: 200 kg/h;
 speed of the double screw: 100 revolutions per minute;
 temperature profile: 40-50-60-50-20-10-10-10° C.
 specific energy: 0.3 kWh/kg
 temperature of elastomeric compound measured at the outlet of the mixer: 125° C.

Example 5

Invention 1

First Step

All the components listed in Table 1, with the addition of 4 phr of liquid reinforcement phenol resin (CELLOBOND J 3111 L, Momentive Specialty Chemicals UK Limited), were mixed together in a Banbury® mixer (model F270), operating at the following work conditions:
 mixing time: 270 seconds;
 fill factor: 70%;
 rotor speed: 60 revolutions per minute;
 unloading temperature: 160° C.
 Intermediate Step The elastomeric compound obtained in accordance with the first step was cooled at ambient temperature (23° C.) and subsequently fed to the aforesaid continuous mixer Maris TM92HT, together with further 14 phr of solid reinforcement phenol resin (DUREZ 12686, Sumitomo Bakelite Europe), continuously fed.

The continuous mixer operated at the following work conditions:
 feeding speed: 200 kg/h;
 speed of the double screw: 100 revolutions per minute;
 temperature profile: (° C.): 40-50-60-50-20-10-10-10
 specific energy: 0.3 kWh/kg
 temperature of elastomeric compound measured at the outlet of the mixer: 125° C.

The intermediate elastomeric compound unloaded from the continuous twin-screw mixer was subsequently cooled at ambient temperature (23° C.) and then subjected to the aforesaid second step of Example 1 in the second batch mixer in order to obtain a final elastomeric compound according to the present invention.

Example 6

Invention 2

First Step

All the components listed in Table 1, without any reinforcement resin, were mixed together in a Banbury® mixer (model F270), operating at the following work conditions:
 mixing time: 270 seconds;
 fill factor: 70%;
 rotor speed: 60 revolutions per minute;
 unloading temperature: 160° C.
 Intermediate Step The elastomeric compound obtained in accordance with the first step was cooled at ambient temperature (23° C.) and subsequently continuously fed to the aforesaid continuous mixer Maris TM92HT, together with further 17 phr of only solid reinforcement phenol resin (DUREZ 12686, Sumitomo Bakelite Europe)), continuously fed.

The continuous mixer operating at the following work conditions:
 feeding speed: 200 kg/h;
 speed of the double screw: 120 revolutions per minute;
 temperature profile: (° C.): 40-50-60-50-20-10-10-10
 specific energy: 0.3 kWh/kg
 temperature of elastomeric compound measured at the outlet of the mixer: 125° C.

The intermediate elastomeric compound unloaded from the continuous twin-screw mixer was subsequently cooled at ambient temperature (23° C.) and then subjected to the aforesaid second step of Example 1 in the second batch mixer in order to obtain a final elastomeric compound according to the present invention.

EXAMPLES 7-8

Preparation of the Elastomeric Compounds

Tables 1a and 2a report the recipe of the components mixed in the batch mixer in the first step and in the second step, respectively, for both examples 7 and 8.

TABLE 1a

| COMPONENT | phr |
|---|---|
| IR high synthetic rubber cis-1,4-polyisoprene, SKI-3, Nizhnekamsk | 100 |
| Mineral oil, MES (Mild Extraction Solvate), ENI SPA | 3 |
| Carbon black, N375, Cabot | 75 |
| Sepiolite, Pangel B5, Tolsa Group: sepiolite modified with quaternary ammonium salt of about 20% by weight, fibres of length comprised between 0.2 µm and 2 µm and diameter comprised between 5 nm and 30 nm (13 phr of Pangel B5 corresponds to about 10 phr of mineral filler) | 13 |
| Stearic acid, Sogis | 2 |
| Zinc oxide, Zincol Ossidi | 8 |
| Bonding octylphenol resin, SP1068, Si Group | 2 |

TABLE 2a

| COMPONENT | phr |
|---|---|
| 50% Silane TESPT (bis[3-(triethoxysilyl)propyl]tetrasulfide) supported on carbon black, X 50-S, Evonik Industries | 4 |
| 65% HMMM hexamethoxymethylmelamine (65%) on inert carrier, Cyrez 964 P.C., Cytec | 8 |
| CTP cyclohexylthiophthalimide, Vulkalent G, Lanxess | 0.3 |
| TBBS:N-tert-butyl-2-benzothiazylsulfenamide, Vulkacit ® NZ/EG C, Lanxess; | 1.5 |
| Sulfur, Redball Superfine, International Sulphur Inc. | 5.3 |

Example 7

Reference 2

First Step

All the components listed in Table 1a, with the addition of 15 phr overall of solid reinforcement phenol resin (DUREZ 12686, Sumitomo Bakelite Europe), were mixed together in a Banbury® mixer (model F270).

Second Step

The elastomeric compound obtained in the first step, cooled at ambient temperature (23° C.), along with all the components of Table 2a, were fed into a Banbury® mixer (model F270) and a further mixing was executed.

The elastomeric compound unloaded from the mixer Banbury® was subsequently cooled at ambient temperature (23° C.).

Example 8

Invention 3

First Step

All the components listed in Table 1a, without any reinforcement resin, were mixed together in a Banbury® mixer (model F270).

Intermediate Step

The elastomeric compound obtained in accordance with the first step was cooled at ambient temperature (23° C.) and subsequently continuously fed to the aforesaid continuous mixer Maris TM92HT, together with 15 phr of only solid reinforcement phenol resin (DUREZ 12686, Sumitomo Bakelite Europe), continuously fed.

The continuous mixer operating at the following work conditions:

- feeding speed: 200 Kg/h;
- speed of the double screw: 100 revolutions per minute;
- temperature profile (° C.): 40-50-60-50-20-10-10-10 (° C.)
- specific energy: 0.27 kWh/kg
- temperature of the elastomeric compound measured at the outlet of the mixer: 120° C.;

Second Step

The intermediate elastomeric compound unloaded from the continuous mixer was subsequently cooled at ambient temperature (23° C.) and then subjected to the second step in the second batch mixer, like in Example 7, in order to obtain a final elastomeric compound according to the present invention.

All the elastomeric compounds obtained in the Examples were tested in order to evaluate the following properties: Mooney (ML 1+4) viscosity, dynamic mechanical properties: the obtained results were given in the Tables 3 and 4 in arbitrary units and relative to the value obtained for the reference sample.

Mooney Viscosity

The Mooney ML(1+4) viscosity at 100° C. was measured, according to the standard ISO 289-1: 2005, on the non-cross-linked elastomeric compounds obtained as described above.

Mechanical Properties

Tables 3 and 4 also show the dynamic mechanical properties, measured by using a dynamic Instron device in the traction-compression mode, according to the following methods. A test sample of cross-linked elastomeric compounds (vulcanised at 170° C., for 10 min.), having cylindrical form (length=25 mm, diameter=14 mm) compression preloaded up to 10% longitudinal deformation with respect to the initial length, and held at the predetermined temperature (23° C. and 70° C.) for the entire duration of the test, was subjected to sinusoidal dynamic stress having an amplitude of ±3.5% with respect to the length under preload, with a frequency of 10 Hz. The dynamic mechanical properties are expressed in terms of dynamic elastic modulus (E') and Tan delta (loss factor) values. The value of Tan delta is calculated as a ratio between the viscous modulus (E") and the elastic modulus (E').

TABLE 3

| EXAMPLE | Mooney Viscosity (ML 1 + 4) | E' (23° C.) | Tan delta (23° C.) | E' (70° C.) | Tan delta (70° C.) |
|---|---|---|---|---|---|
| Example 1 (Reference 1) | 100 | 100 | 100 | 100 | 100 |
| Example 2 (Comparative 1) | 96 | 100 | 100 | 103 | 99 |
| Example 3 (Comparative 2) | 90 | 98 | 100 | NA | NA |
| Example 4 (Comparative 3) | 88 | 99 | 102 | 95 | 103 |
| Example 5 (Invention 1) | 86 | 116 | 101 | 118 | 103 |
| Example 6 (Invention 2) | 84 | 121 | 103 | 125 | 105 |

TABLE 4

| EXAMPLE | Mooney Viscosity (ML 1 + 4) | E' (23° C.) | Tan delta (23° C.) | E' (70° C.) | Tan delta (70° C.) |
|---|---|---|---|---|---|
| Example 7 (Reference 2) | 100 | 100 | 100 | 100 | 100 |
| Example 8 (Invention 3) | 94 | 115 | 103 | 110 | 101 |

The data reported in the above Tables 3 and 4 shows that the elastomeric compounds obtained in accordance with the present invention (Examples 5, 6 and 8), in which at least a substantial part of the content of reinforcement resin is incorporated in an intermediate step of continuous mixing, have both an improved viscosity for the purpose of workability and, after cross-linking, an improved rigidity at all temperatures, with respect to all the other compounds (Examples 1-4 and 7) made with alternative techniques.

In particular, the use of only solid reinforcement resin, at least a substantial part of the content thereof incorporated in the continuous mixer, is particularly advantageous in terms of characteristics of the resulting compound and of the corresponding cross-linked material.

Even if the invention has been exemplified with regard to the achievement of a bead structure of a tyre, this allows attaining the described results also with other particularly rigid components of the tyre, such as the coating (or rubber-coating) of the annular anchoring structures, the anti-abrasive strip or the sidewall insert for self-supporting tyres.

The invention claimed is:

1. A process for producing tyres, comprising:
    building a green tyre comprising two bead structures, each bead structure comprising a bead filler and annular anchoring structures; and
    subjecting the green tyre to moulding and cross-linking to obtain a finished tyre,
        wherein at least one rigid component of said green tyre selected from among said bead filler, a coating of said annular anchoring structures, an anti-abrasive strip and a sidewall insert comprises a final elastomeric compound comprising at least one elastomeric polymer, at least one reinforcement filler, components capable of facilitating the cross-linking, and at least 5 phr of reinforcement resin, and wherein said final elastomeric compound is produced by:
feeding at least the elastomeric polymer and the reinforcement filler to a first batch mixing device,
mixing and dispersing, in said first batch mixing device, at least said reinforcement filler into said elastomeric polymer in a manner so as to obtain a first-phase elastomeric compound,
unloading said first-phase elastomeric compound from said first batch mixing device,
feeding said first-phase elastomeric compound to a continuous mixing device, said continuous mixing device being selected from an intermeshing and co-rotating twin-screw or multi-screw device and a planetary device,
feeding to said continuous mixing device, separate from said first phase elastomeric compound, at least 5 phr of reinforcement resin,
mixing and dispersing in said continuous mixing device said reinforcement resin into said first-phase elastomeric compound to obtain an intermediate elastomeric compound, said mixing in said continuous mixing device being executed at a speed from about 40 revolutions per minute to about 400 revolutions per minute,
unloading said intermediate elastomeric compound from said continuous mixing device,
feeding said intermediate elastomeric compound to a second batch mixing device,
feeding to said second batch mixing device, separate from said intermediate elastomeric compound, components capable of facilitating the cross-linking,
mixing, in said second batch mixing device, said components capable of facilitating the cross-linking into said intermediate elastomeric compound to obtain said final elastomeric compound, wherein each of said first and second batch mixing device has two counter-rotating rotors and the mixing in said batch mixing devices is executed at a speed from about 5 revolutions per minute to about 80 revolutions per minute, and
unloading said final elastomeric compound from said second batch mixing device.

2. The process as claimed in claim 1, wherein said elastomeric polymer is selected from the group consisting of diene elastomeric polymers, mono-olefin elastomeric polymers, and mixtures thereof.

3. The process as claimed in claim 1, wherein an overall content of the reinforcement filler in said final elastomeric compound is greater than 10 phr and less than 120 phr and wherein an entire content of the elastomeric polymer and/or reinforcement filler of the final elastomeric compound is fed into said first batch mixing device.

4. The process as claimed in claim 1, wherein said components capable of facilitating the cross-linking are present in the final elastomeric compound in a quantity greater than about 3.5 phr and less than or equal to about 7.5 phr and wherein an entire content of said components present in the final elastomeric compound is fed into said second batch mixing device.

5. The process as claimed in claim 1, wherein an entire content of the reinforcement resin of the final elastomeric compound is solid resin.

6. The process as claimed in claim 1, wherein said reinforcement resin comprises solid reinforcement resin and an entire content of the solid reinforcement resin is fed into said continuous mixing device.

7. The process as claimed in claim 1, wherein at least 70% of the reinforcement resin of the final elastomeric compound is fed into said continuous mixing device.

8. The process as claimed in claim 1, wherein no other component, except said first-phase elastomeric compound and said reinforcement resin, is fed to said continuous mixing device.

9. The process as claimed in claim 1, wherein an overall content of the reinforcement resin in said final elastomeric compound is greater than or equal to 8 phr and/or less than or equal to 25 phr.

10. The process as claimed in claim 1, wherein said reinforcement resin comprises a methylene acceptor compound and wherein the final elastomeric compound comprises a quantity of methylene donor compound greater than about 1 phr and less than about 15 phr.

11. The process as claimed in claim 1, wherein the final elastomeric compound comprises a quantity of methylene acceptor compound greater than about 5 phr and less than about 25 phr.

12. The process as claimed in claim 10, wherein the methylene acceptor compound is selected from the group consisting of: resorcinol; catechol; hydroquinone; pyrogallol; phloroglucinol; 1-naphthol; 2-naphthol phenol resins; modified phenol resins; phenol resins; and mixtures of the above mentioned compounds.

13. The process as claimed in claim 1, wherein said final elastomeric compound comprises inorganic fibres of silicates of magnesium and/or aluminium of nanometric size in a quantity greater than about 5 phr and/or less than about 25 phr.

14. The process as claimed in claim 1, wherein said first and/or second batch mixing device is an internal mixer and wherein said two counter-rotating rotors of the batch mixing device function tangentially with respect to each other or are inter-meshing.

15. The process as claimed in claim 1, wherein said mixing in said first and/or second batch mixing device is executed in a time interval between 50 seconds and 600 seconds.

16. The process as claimed in claim 1, wherein said co-rotating twin-screw or multi-screw device has screws with mastication elements and transport elements, said mastication elements being selected from one or more of compression mastication elements and shearing mastication elements.

17. The process as claimed in claim 1, wherein said continuous mixing device is a ring mixer.

18. The process as claimed in claim 1, wherein said continuous mixing device is of a self-cleaning type.

19. The process as claimed in claim 1, wherein said mixing in said continuous mixing device is executed at a specific energy greater than or equal to about 0.1 kWh/kg and/or less than or equal to about 0.6 kWh/kg.

20. The process as claimed in claim 1, wherein the process further comprises cooling said first-phase elastomeric compound to a temperature ranging from about 15° C. to about 40° C. before feeding said first-phase elastomeric compound to said continuous mixing device.

21. The process as claimed in claim 1, wherein the process further comprises cooling said intermediate elastomeric compound to a temperature ranging from about 15° C. to about 40° C. before feeding said intermediate elastomeric compound to said second batch mixing device.

22. The process as claimed in claim 1, wherein the first-phase elastomeric compound is fed to a conveyer device before being fed to said continuous mixing device, said conveyor being of helical single-screw or counter-rotating helical twin-screw type.

23. The process as claimed in claim 1, wherein said final elastomeric compound is fed to a device for building a semi-finished product, in which said final elastomeric compound is shaped into a strip of elastomeric compound having a size suitable for incorporation into the green tyre as said rigid component.

24. The process as claimed in claim 1, wherein said planetary device has satellites with mastication elements and transport elements, said mastication elements being selected from one or more of compression mastication elements and shearing mastication elements.

25. The process as claimed in claim 1, wherein an overall content of the reinforcement resin in said final elastomeric compound is greater than 10 phr.

26. The process as claimed in claim 1, wherein said components capable of facilitating the cross-linking comprise vulcanising agents and/or accelerant agents.

* * * * *